Figure 4:
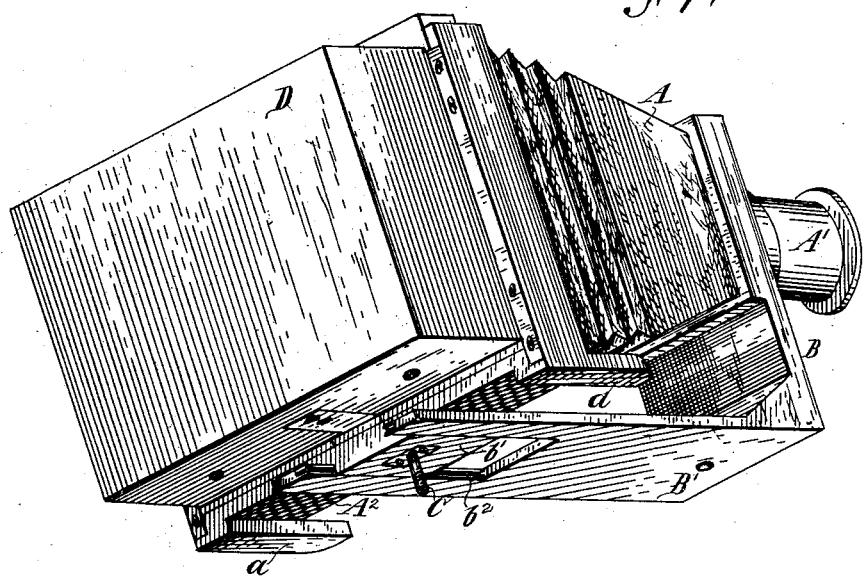

(No Model.) 2 Sheets—Sheet 1.
M. FLAMMANG.
PHOTOGRAPHIC CAMERA.
No. 357,984. Patented Feb. 15, 1887.
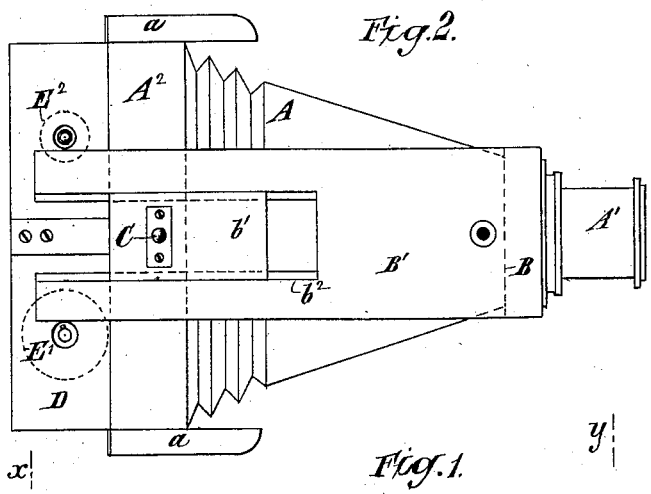
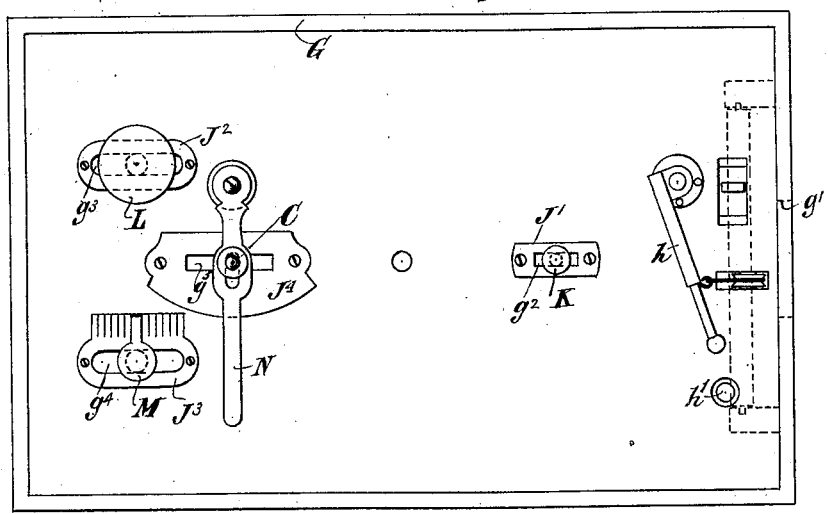
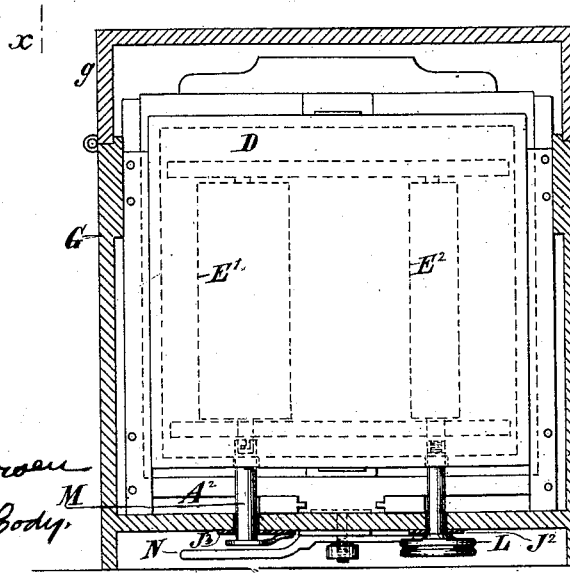
Witnesses
Inventor,
M. Flammang
by his attys,
Gifford & Brown.

(No Model.) 2 Sheets—Sheet 2.

M. FLAMMANG.
PHOTOGRAPHIC CAMERA.

No. 357,984. Patented Feb. 15, 1887.

UNITED STATES PATENT OFFICE.

MATHIAS FLAMMANG, OF NEWARK, NEW JERSEY, ASSIGNOR TO THE SCOVILL MANUFACTURING COMPANY, OF NEW YORK, N. Y.

PHOTOGRAPHIC CAMERA.

SPECIFICATION forming part of Letters Patent No. 357,984, dated February 15, 1887.

Application filed December 24, 1885. Serial No. 186,621. (No model.)

*To all whom it may concern:*

Be it known that I, MATHIAS FLAMMANG, of Newark, in the county of Essex and State of New Jersey, have invented a certain new and useful Improvement in Photographic Cameras, of which the following is a specification.

My improvement relates to the kind of photographic cameras which are known as "detective" cameras, and are arranged in boxes or cases so that they will be disguised, in order that persons may carry them around without being known as photographers in search of subjects for pictures. These cameras have been objectionable on account of the necessity for opening their boxes or cases frequently in using them.

The object of my improvement is to provide for making an exposure and focusing in a detective camera without opening the box or case frequently.

I will describe in detail a photographic camera embodying my improvement, and then point out the novel features in the claims.

In the accompanying drawings, Figure 1 is an inverted plan or bottom view of a detective camera embodying my improvement. Fig. 2 is an inverted plan or bottom view of the camera proper removed from the box or case. Fig. 3 is a transverse section of the complete camera, taken at the plane of the dotted line $x$ $x$, Fig. 1. Fig. 4 is a perspective view of the camera removed from its box or case.

Similar letters of reference designate corresponding parts in all the figures.

A A' A$^2$ designate the camera proper, A being the body, A' being the lens-tube at the forward end of the body, and A$^2$ being a movable back. The body A is supported in a bracket, B, erected on a frame, B'. The movable back A$^2$ is provided with supporting-feet $a$ and a tongue-piece, $b'$, which fits in a slot, $b^2$, in the frame B'. The movable back A$^2$ can therefore slide lengthwise of the frame B. It is provided with a screw, C, which forms a downward extension of it.

D designates a holder for sensitized paper. The paper is attached to rollers E' E$^2$. It is first wound mainly on the roller E', and as it is used it is wound from the latter onto the roller E$^2$.

G designates a box or case provided with a hinged cover, $g$, and furnished at the front with an opening, $g'$, and shutter mechanism H and a curtain, I. The shutter mechanism is operated by a lever, $h$, arranged below the box or case, to set the shutter, and the shutter is released by means of a push-piece, $h'$.

The frame B' and the feet $a$ of the movable back A$^2$ of the camera rest on the bottom of the box or case G, and can move along the same in the direction of its length.

The bottom of the box or case G has longitudinal slots $g^2$ $g^3$ $g^4$ $g^5$ in it. Face-plates or escutcheons of metal J' J$^2$ J$^3$ J$^4$ are fastened in place on the bottom of the box or case adjacent to these slots. A screw, K, extends through the slot $g^2$ and enters the frame B', thereby securing the latter in place after its adjustment. A screw, L, is passed through the slot $g^3$ and fastened in one of the journals of the roller E$^2$. It, in effect, forms part of the journal in which it is secured. The handle of this screw may be manipulated to rotate the roller E$^2$, for the purpose of winding the sensitized paper on it. A rod, M, extends through the slot $g^4$, and is fastened, preferably, by a bayonet-joint to one of the journals of the roller E'. It is, in effect, part of this journal. A pointer is affixed to its end. This pointer rotates with the journal of the roller E'. On the face-plate J$^3$ are a number of parallel marks. When the sensitized paper is in a proper position for exposure the pointer will be in the position shown—namely, parallel with the marks on the plate J$^3$—and when an exposure has been made and the sensitized paper moved the rotating pointer, by being returned to the position indicated, will show that fresh paper has been brought into a position for exposure. I have shown a number of parallel marks, because then there will always be a guide for the pointer into whatever position the latter may be adjusted by being moved lengthwise of the box or case.

The screw C projects through the slot $g^5$ and extends through the slot of a lever, N, arranged transversely to the box or case and pivoted or fulcrumed to the bottom. A nut applied to the end of the screw provides for clamping the lever N in position to secure the camera-back when adjusted. The lever, when released from the nut, serves for adjusting the camera-back.

The sides and ends of the box or case G extend considerably below the bottom, so that the parts arranged below the bottom will not come in contact with a support on which the box or case may be placed.

The cover of the box or case needs only to be opened when it becomes necessary to operate the shutter or slide of the camera-back.

What I claim as my invention, and desire to secure by Letters Patent, is—

1. The combination, with a camera having rollers for sensitized paper and a movable back by which the rollers are supported, of a box or case wholly inclosing the camera and provided with a slot through which a journal of the roller onto which the sensitized paper after exposure is to be wound protrudes, and another slot through which passes from the movable camera-back an extension whereby it can be adjusted from outside the box or case toward and from the body of the camera, substantially as specified.

2. The combination, with a camera having rollers for sensitized paper and a movable back by which the rollers are supported, of a box or case wholly inclosing the camera and provided with a slot through which a journal of the roller onto which the sensitized paper after exposure is to be wound protrudes, another slot through which a journal of the other roller protrudes, a pointer carried by the protruding journal of the latter roller, and another slot through which passes from the movable camera-back an extension whereby it can be adjusted from outside the box or case toward and from the body of the camera, substantially as specified.

MATHIAS FLAMMANG.

Witnesses:
 JAS. R. BOWEN,
 EDWIN H. BROWN.